United States Patent
Dudar

(10) Patent No.: US 12,460,567 B2
(45) Date of Patent: Nov. 4, 2025

(54) METHODS AND SYSTEMS FOR A FUEL OPERATED HEATER

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 33 days.

(21) Appl. No.: 18/417,439

(22) Filed: Jan. 19, 2024

(65) Prior Publication Data

US 2025/0237164 A1    Jul. 24, 2025

(51) Int. Cl.
| | | |
|---|---|---|
| *F01N 5/02* | (2006.01) | |
| *F01N 3/20* | (2006.01) | |
| *F01N 9/00* | (2006.01) | |
| *F01N 13/00* | (2010.01) | |

(52) U.S. Cl.
CPC ............ *F01N 5/02* (2013.01); *F01N 3/2033* (2013.01); *F01N 9/007* (2013.01); *F01N 13/002* (2013.01); *F01N 2610/146* (2013.01); *F01N 2900/04* (2013.01); *F01N 2900/1404* (2013.01); *F01N 2900/1406* (2013.01); *F23N 2241/14* (2020.01)

(58) Field of Classification Search
CPC ........ F01N 5/02; F01N 3/2033; F01N 3/2013; F01N 9/00; F01N 13/002; F01N 2610/146; F01N 2241/14; F01N 2900/04; F01N 2900/1404; F01N 2900/1406; F01N 2590/11; F02M 2025/0881; F02M 25/0836; F02M 25/0854; F02M 25/08; F02M 35/10222; F02D 41/0025; F02D 41/003; F02D 41/0047; Y02T 10/12; Y02T 10/40
See application file for complete search history.

(56) References Cited

U.S. PATENT DOCUMENTS

| | | | | |
|---|---|---|---|---|
| 4,991,396 A * | 2/1991 | Goerlich | ........... | F23G 7/065 |
| | | | | 126/116 A |
| 5,950,420 A * | 9/1999 | Geiger | ........... | F01N 3/025 |
| | | | | 60/311 |
| 6,079,629 A * | 6/2000 | Morikawa | ........... | F01P 3/20 |
| | | | | 237/12.3 C |
| 8,209,967 B2 * | 7/2012 | Birkby | ........... | F02M 26/15 |
| | | | | 60/303 |

(Continued)

FOREIGN PATENT DOCUMENTS

| DE | 102008036255 A1 | 2/2010 |
|---|---|---|
| DE | 102020126714 A1 * | 4/2022 |

OTHER PUBLICATIONS

"Heavy-Duty Diesel Vehicle Idling Information," California Air Resources Board Website, Available Online at https://ww2.arb.ca.gov/capp-resource-center/heavy-duty-diesel-vehicle-idling-information, Available as Early as Jun. 29, 2021, 3 pages.

(Continued)

*Primary Examiner* — Dapinder Singh

(74) *Attorney, Agent, or Firm* — Vincent Mastrogiacomo; McCoy Russell LLP

(57) ABSTRACT

Methods and systems are provided for a fuel system. In one example, a method may include adjusting operation of a fuel-operated heater (FOH) and an exhaust system to regenerate the FOH. The operation may include flowing gases from the exhaust system to the FOH to return the FOH to a less coked state.

17 Claims, 6 Drawing Sheets

(56) References Cited

U.S. PATENT DOCUMENTS

| | | | |
|---|---|---|---|
| 8,347,607 B2 | 1/2013 | Gonze et al. | |
| 10,502,151 B2 | 12/2019 | Kelly et al. | |
| 2007/0084206 A1* | 4/2007 | Lew | F01N 13/107 |
| | | | 60/599 |
| 2007/0220867 A1* | 9/2007 | Clerc | F01N 3/035 |
| | | | 60/303 |
| 2022/0333518 A1* | 10/2022 | Nau | F01N 3/101 |
| 2023/0032897 A1* | 2/2023 | Sensi | F01N 3/0253 |

OTHER PUBLICATIONS

Foote B., "Ford Plug-In Hybrids Still Allowed Uner New 2035 Carb Ruling," Ford Authority Website, Available Online at https://fordauthority.com/2022/08/ford-plug-in-hybrids-still-allowed-under-new-2035-carb-ruling/, Aug. 26, 2022, 1 page.

Dudar, A., "Methods and Systems for an Evaporative Emission System," U.S. Appl. No. 18/454,279, filed Aug. 23, 2023, 42 pages.

\* cited by examiner

METHODS AND SYSTEMS FOR A FUEL OPERATED HEATER

FIELD

The present description relates generally to methods and systems for a fuel operated heater of a vehicle.

BACKGROUND/SUMMARY

Vehicles may include a fuel operated heater (FOH) to provide cabin heating during conditions where engine power loss occurs. The FOH may combust fuel to heat a heat exchanger thereof to warm ambient air. The warmed ambient air may flow to a vehicle cabin interior.

The FOH may become fouled due to soot particulate matter production. Fouling of the FOH may increase when the vehicle is at higher altitudes (e.g., higher than 5,000 feet from sea level) as oxygen becomes less available. At higher altitudes, the FOH may experience incomplete combustion, which may increase fouling and decrease an efficiency thereof. Thus, methods and systems for cleaning the FOH may be desired.

In one example, the issues described above may be addressed by a system including a fuel operated heater (FOH) fluidly coupled to an exhaust system of an engine. In this way, exhaust gases may be used to regenerate the FOK to a less coked state.

As an example, a multi-position valve may be positioned in a passage fluidly coupled to an exhaust passage and the FOH. The multi-position valve may be configured to control fresh air and exhaust gas flow to the FOH. When a regeneration request of the FOH is present, the multi-position valve may be actuated to a position that admits exhaust gases from the exhaust passage to the regeneration passage. By doing this, hot exhaust gases may flow to the FOH and burn soot and other contaminants.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
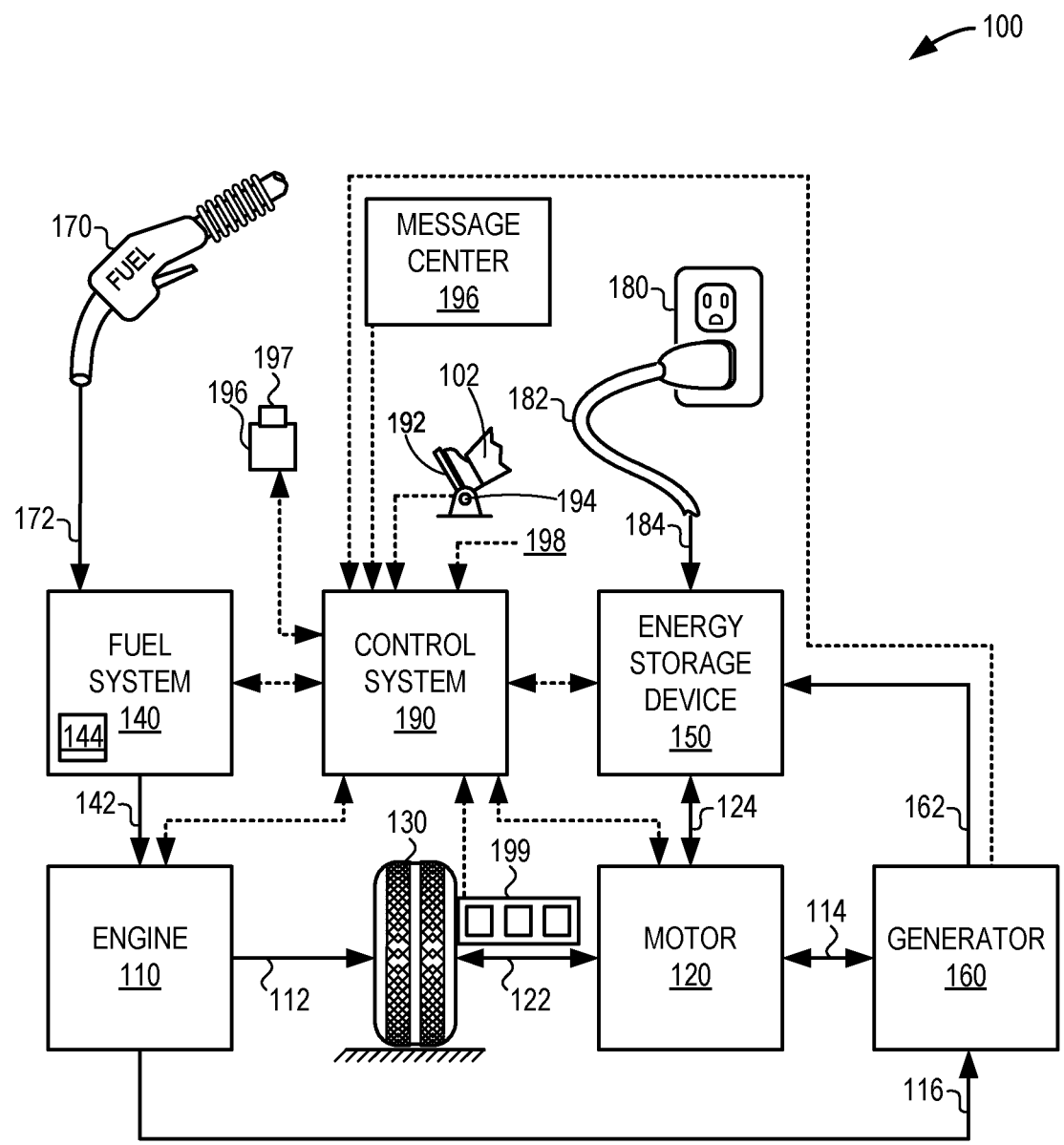
FIG. 1 shows a high-level block diagram illustrating an example vehicle propulsion system.
Figure 2:
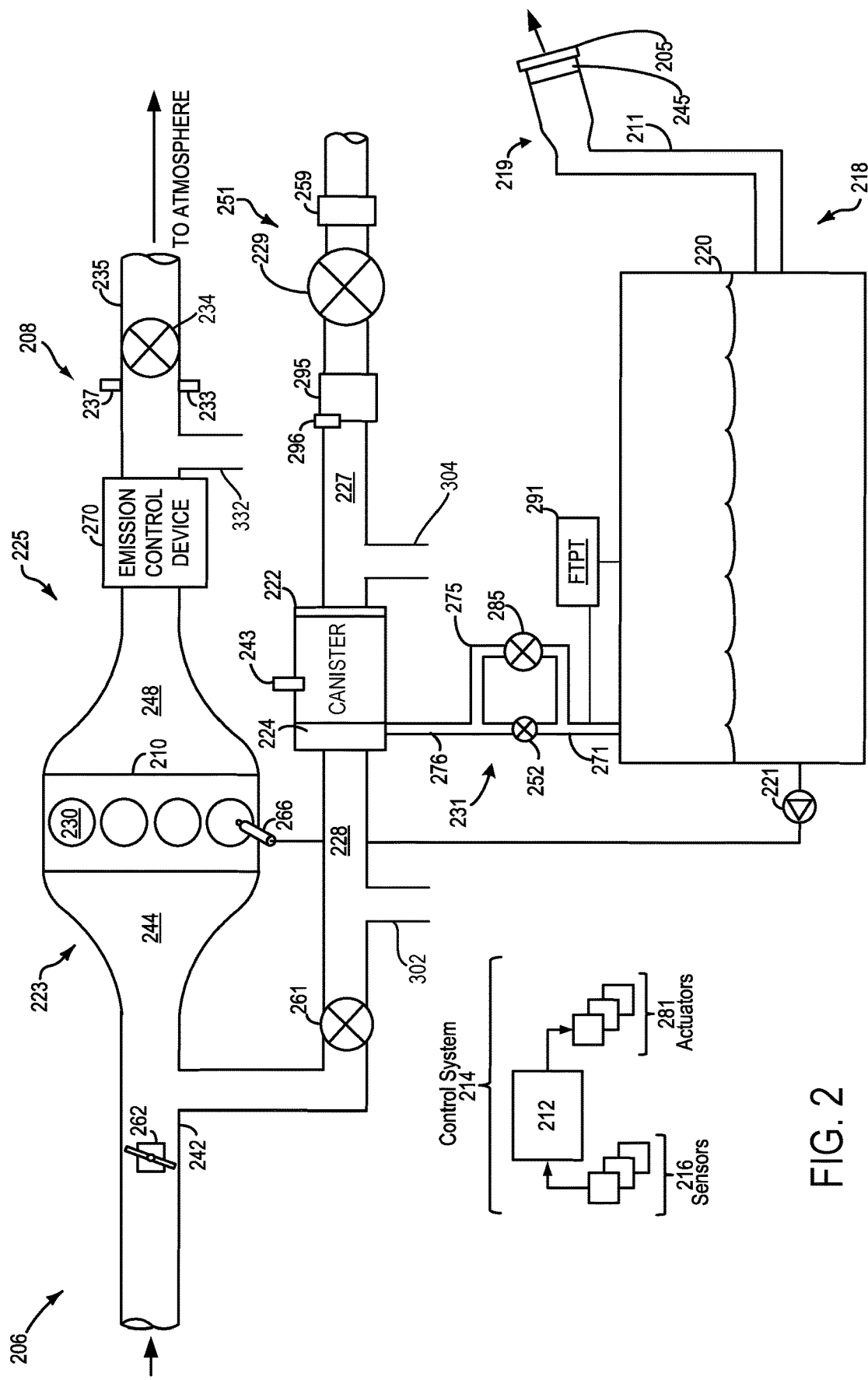
FIG. 2 shows an example engine system, fuel system, and evaporative emissions control (EVAP) system included in the example vehicle system of FIG. 1.
Figure 3:
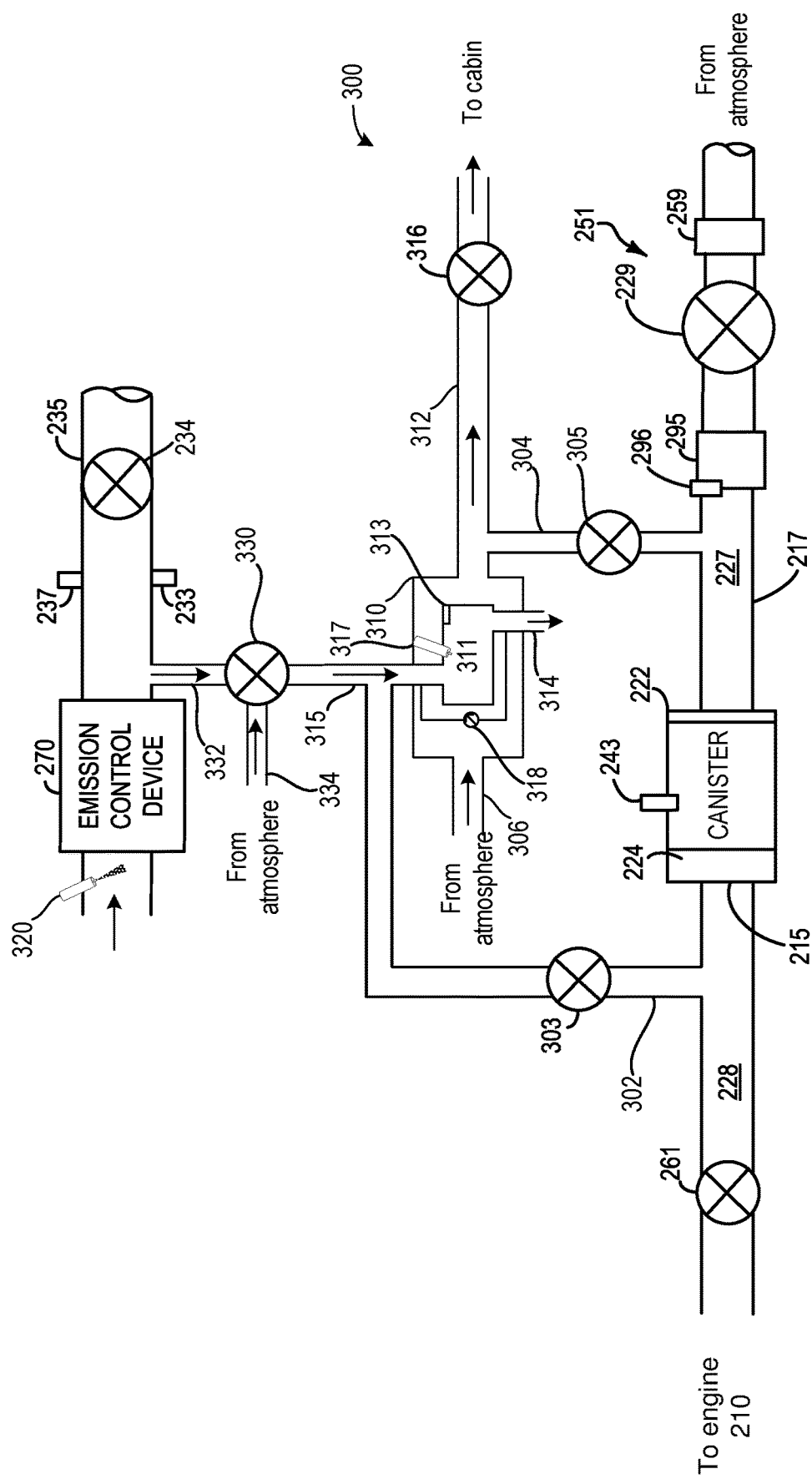
FIG. 3 shows an example of a fuel operated heater (FOH) system coupled to an exhaust system of the engine system.
Figure 4:
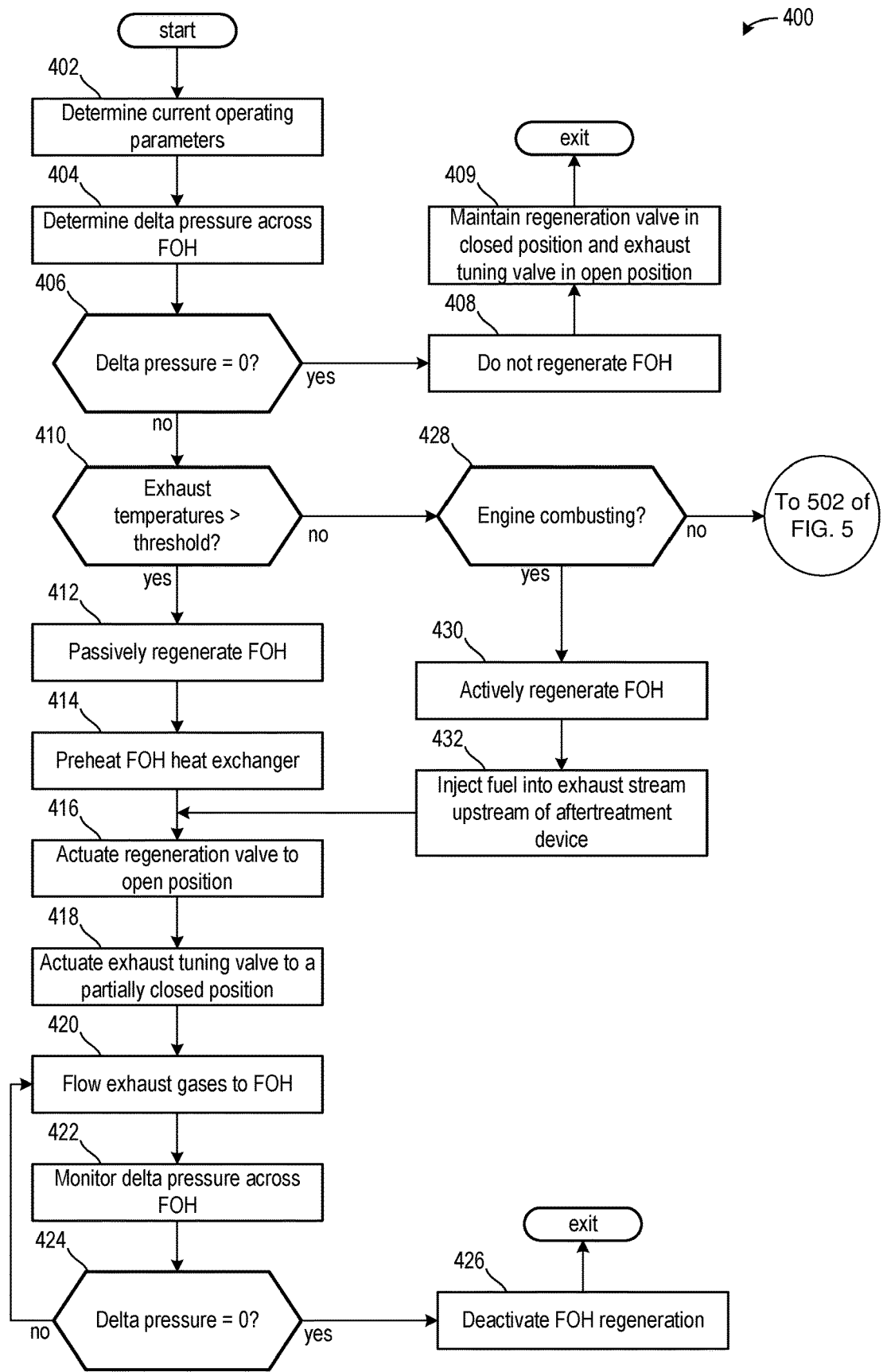
FIG. 4 shows a first method for cleaning the FOH when an engine is combusting fuel.
Figure 5:
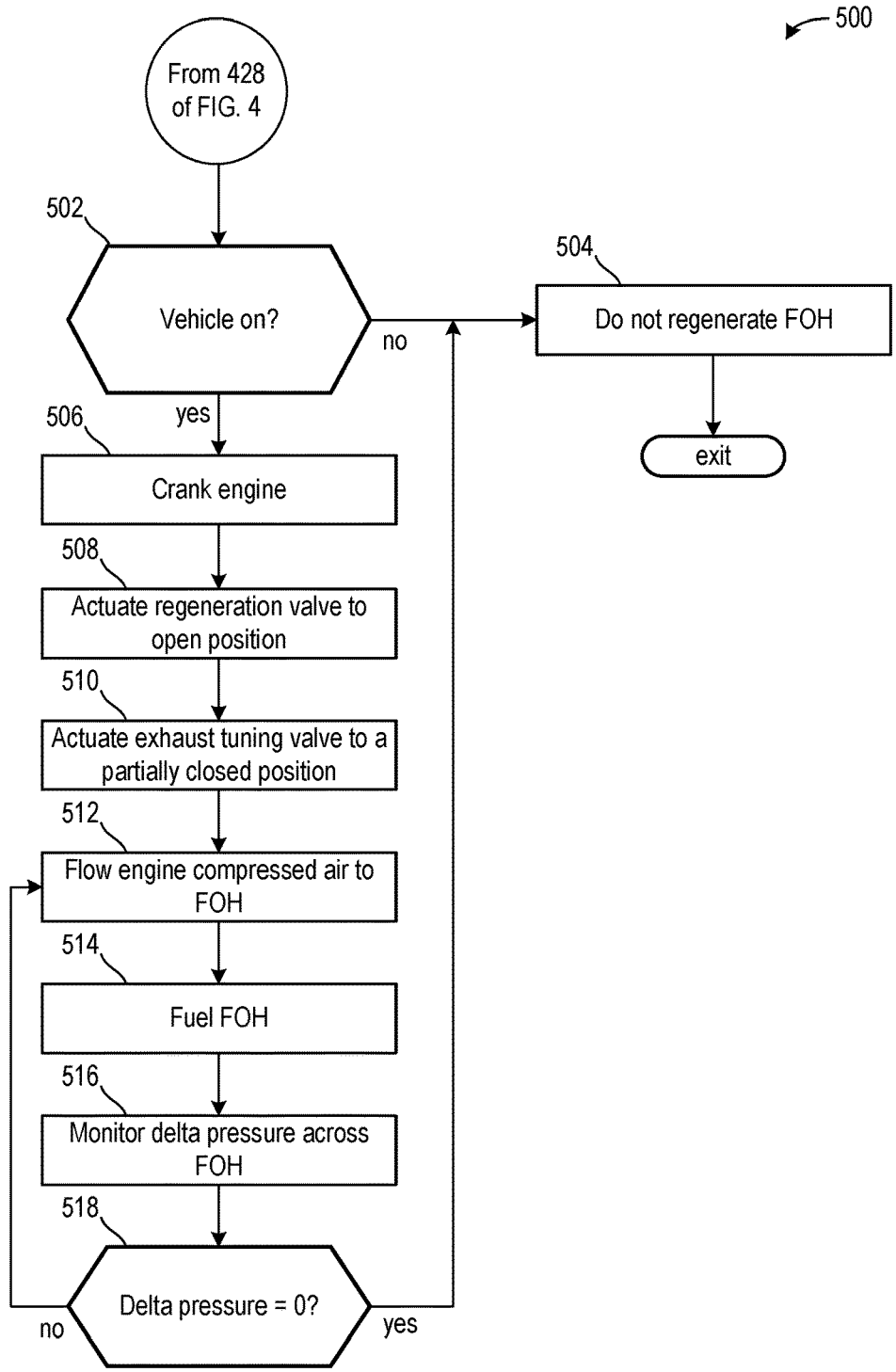
FIG. 5 shows a second method for cleaning the FOH when the engine is not combusting fuel.
Figure 6:
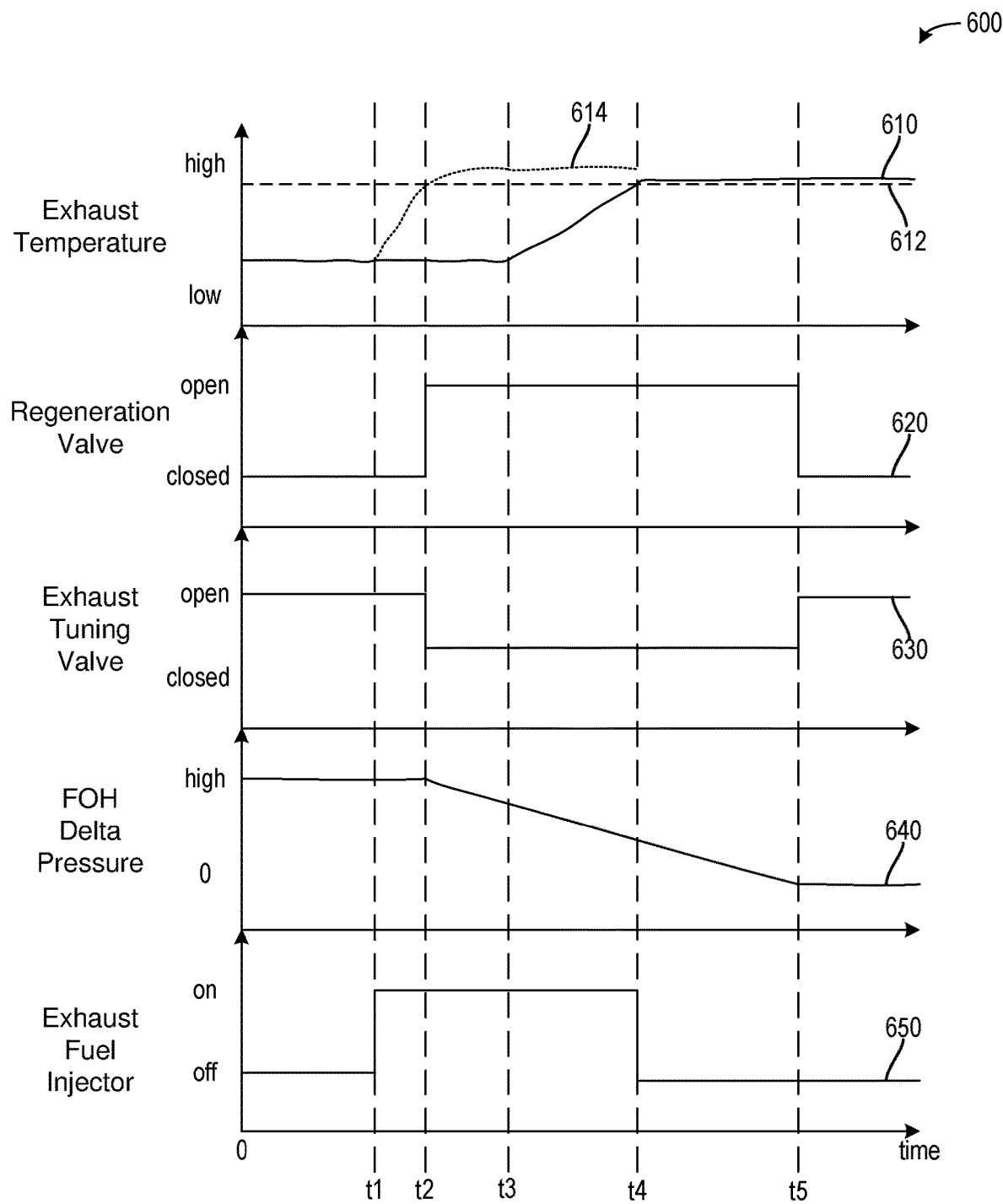
FIG. 6 shows an operating sequence illustrating FOH system and exhaust system conditions.

The following description relates to systems and methods for a FOH system of a vehicle. The vehicle may be an at least partially electric vehicle including an all-electric mode. FIG. 1 shows a high-level block diagram illustrating an example vehicle propulsion system. FIG. 2 shows an example engine system, fuel system, and evaporative emissions control (EVAP) system included in the example vehicle system of FIG. 1. FIG. 3 shows an example of a fuel operated heater (FOH) system coupled to an exhaust system of the engine system. FIG. 4 shows a first method for cleaning the FOH when an engine is combusting fuel. FIG. 5 shows a second method for cleaning the FOH when the engine is not combusting fuel. FIG. 6 shows an operating sequence illustrating FOH system and exhaust system conditions.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative energy recovery of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a friction pedal and/or a drive pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical rate of change of velocity sensor to indicate road roughness. These devices may be connected to control system 190.

FIG. 2 shows a schematic depiction of a vehicle system 206. The vehicle system 206 includes an engine system 208 coupled to an evaporative emissions control system 251 and a fuel system 218. Emissions control system 251 includes a fuel vapor container such as fuel vapor canister 222 which may be used to capture and store fuel vapors. In some examples, vehicle system 206 may be a hybrid electric vehicle system, such as the vehicle propulsion system 100 of FIG. 1.

The engine system 208 may include engine 210 having a plurality of cylinders 230. In one example, engine 210 is an embodiment of engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

A FOH regeneration passage 332 may be arranged downstream of the emission control devices 270 and upstream of an exhaust tuning valve 234. The FOH regeneration passage 332 may divert exhaust gases from the exhaust passage 235 to a FOH when regeneration of the FOH is requested. The exhaust tuning valve 234 may be moved to a more closed position to promote exhaust gas flow into the FOH regeneration passage 332. The FOH regeneration passage 332 and the exhaust tuning valve 234 are described in greater detail with respect to FIG. 3.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as an example injector 266 shown. While a single injector 266 is shown, additional injectors are provided for each cylinder. It will be appreciated that fuel system 218 may be a return-less fuel system, a return fuel system, or various other types of fuel system.

Vapors generated in fuel system 218 may be routed to the evaporative emissions control system 251, which includes fuel vapor canister 222 via vapor line 231, before being purged to the engine intake 223. Vapor line 231 may be coupled to fuel tank 220 via one or more conduits and may include one or more valves for isolating the fuel tank during certain conditions. For example, vapor line 231 may be coupled to fuel tank 220 via one or more or a combination of conduits 271, 275, and 276.

Further, in some examples, one or more fuel tank vent valves may be positioned in conduits 271, 275, or 276. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a fuel tank isolation valve (FTIV) 252. Conduit 275 may include a relief valve (RV) 285. In one example, the conduit 275 is a bypass conduit, wherein the RV 285 is configured to flow vapors to the canister 222 when the FTIV 252 is closed. Further, in some examples, vapor line 231 may be coupled to a refueling system 219. In some examples, refueling system 219 may include a fuel cap 205 for sealing off the fuel filler system from the atmosphere. Refueling system 219 is coupled to fuel tank 220 via a fuel filler pipe 211.

Further, refueling system 219 may include a refueling lock 245. In some embodiments, the refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on vehicle instrument panel 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters are configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 that may route gases out of the fuel vapor canister 222 to the atmosphere when storing, or trapping, fuel vapors from fuel system 218. When the emissions control system 251 includes more than one canister 222, the canisters may be arranged in series or in parallel. When the canisters are arranged in series, gases may be routed to a first canister of the more than one canisters, then from the first canister to a second canister of the more than one canisters, and so on for additional canisters of the one or more canisters. When the canisters are arranged in parallel, a total volume of gases routed through the more than one canisters may be routed to the first canister or the second canister, or the total volume of gases may be divided into two volumes with a first volume of the two volumes routed through the first canister and a second volume of the two volumes routed through the second canister.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be controlled by canister vent valve 229.

Evaporative emission detection routines may be intermittently performed by controller 212 on fuel system 218 to confirm that the fuel system is not degraded. As such, evaporative emission detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, evaporative emission detection routines may be performed while the engine is running by operating a vacuum pump and/or using engine intake manifold vacuum. Evaporative emission tests may be performed by an evaporative leak check module (ELCM) 295 communicatively coupled to controller 212. ELCM 295 may be coupled in vent line 227, between canister 222 and the vent valve 229. ELCM 295 may include a vacuum pump configured to apply a negative pressure to the fuel system when in a first conformation, such as when administering a leak test. ELCM 295 may further include a reference orifice and a pressure sensor 296. Following the application of vacuum to the fuel system, a change in pressure at the reference orifice (e.g., an absolute change or a rate of change) may be monitored and compared to a threshold. Based on the comparison, evaporative emissions from the fuel system may be identified. The ELCM vacuum pump may be a reversible vacuum pump, and thus configured to apply a positive pressure to the fuel system when a bridging circuit is reversed placing the pump in a second conformation.

Canister 222 may include a first buffer 224 surrounding load port 213. Like canister 222, buffer 224 may also include adsorbent. The volume of buffer 224 may be smaller than (e.g., a fraction of) the volume of canister 222. The adsorbent in the buffer 224 may be same as, or different from, the adsorbent in the canister (e.g., both may include charcoal).

Buffer 224 may be positioned within canister 222 such that during canister loading through load port 213, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In comparison, when purging canister 222 with air drawn through vent line 227, fuel vapors are first desorbed from the canister (e.g., to a threshold amount) before being desorbed from the buffer. In other words, loading and unloading of buffer 224 is not linear with the loading and unloading of the canister. As such, the effect of the canister buffer is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via an outlet conduit 276, the outlet conduit 276 diverging from the fuel tank isolation valve (FTIV) 252 which controls the flow of fuel tank vapors from fuel tank 220 and through the inlet conduit 271 into canister 222. By adjusting a position of FTIV 252, fuel vapor flow from the fuel tank 220 to the canister 222 can be varied. FTIV 252 may be actuated to a first, open position that couples fuel tank 220 to canister 222 via conduit 276. In an example where the emissions control system 251 includes more than one canister 222 arranged in parallel, adjusting the position of the FTIV 252 to a first position may direct fuel vapor flow from the fuel tank 220 to a first canister, adjusting to a second position may direct fuel vapor flow from the fuel tank 220 to a second canister, and adjusting to a third position may direct fuel vapor flow from the fuel tank 220 to both the first and the second canisters. The FTIV 252 may also be actuated to a fourth, closed position.

For example, FTIV 252 may be actuated to a closed position that seals fuel tank 220 from canister 222 when the emissions control system 251 includes one canister 222, wherein no fuel vapors flow through conduit 276. Controller 212 may command an FTIV position based on fuel system conditions including an operator request for refueling, fuel tank pressure, and canister load. In a second example, a 0.03" orifice is included in the place of FTIV 252 to restrict vapor flow to the canister.

In configurations where the vehicle system 206 is a hybrid electric vehicle (HEV), fuel tank 220 may be configured as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore, the use of a sealed fuel tank with a closed FTIV (also referred to as NIRCOS, or Non-Integrated Refueling Canister Only System), prevents diurnal and running loss vapors from loading the fuel vapor canister 222, and limits fuel vapor canister loading via refueling vapors only. FTIV 252 may be selectively opened responsive to a refueling request to depressurize the fuel tank 220 before fuel can be received into the fuel tank via fuel filler pipe 211. In particular, when the emissions control system 251 includes one canister 222, FTIV 252 may be actuated to the first open position to depressurize the fuel tank to the canister via first conduit 276 and canister load port 213.

In some embodiments (not shown), a pressure control valve (PCV) (e.g., RV 285) may be configured in a conduit coupling fuel tank 220 to canister 222 in parallel to conduit 276. When included, the RV may be controlled by the powertrain control module (e.g. controller 212) using a pulse-width modulation cycle to relieve any excessive pressure generated in the fuel tank, such as while the engine is running. Additionally or optionally, the RV may be pulse-width modulated to vent excessive pressure from the fuel tank when the vehicle is operating in electric vehicle mode, for example in the case of a hybrid electric vehicle.

When transitioned to a second (open) position for the emissions control system 251 with one canister 222, FTIV 252 allows for the venting of fuel vapors from fuel tank 220 to canister 222. The second open position may be a fully open position and the first open position may be a partially open position, e.g., half open.

For the emissions control system 251 with at least one canister 222, including more than one canister 222 arranged in parallel, fuel vapors may be stored in canister 222 while air stripped off fuel vapors exits into atmosphere via canister vent valve 229. Stored fuel vapors in the canister 222 may be purged to engine intake 223, when engine conditions permit, via the purge valve 261. Refueling lock 245 may be unlocked to open a fuel cap after fuel tank is sufficiently depressurized, such as below the second threshold pressure.

The RV 285 may open during conditions where the fuel tank pressure exceeds a threshold fuel tank pressure without input from controller 212. This may occur during conditions where the controller 212 is asleep, which may occur when the engine is off and/or when the vehicle is off. Venting events when the controller 212 is asleep may go untracked in other examples, leading to insufficient canister cleanings, which may result in vapors being released to atmosphere. This may be exacerbated in hybrid vehicles where the engine may be off for prolonged periods of vehicle operation. In one example, the evaporative emissions control system 251 may be fluidly coupled to a fuel operated heater (FOH) system via a first passage 302 and a second passage 304. The FOH system is illustrated in further detail with respect to FIG. 3. The FOH system may be operated to flow hot air to the canister 222, which may release vapors therefrom during desired conditions. Operation of the FOH system is described in greater detail below.

The vehicle system 206 may further include a control system 214 (such as control system 190 of FIG. 1). Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, canister load sensor 243, and ELCM pressure sensor 296. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include the fuel injector 266, the throttle 262, the FTIV 252, the refueling lock 245, the canister vent valve 229, and the purge valve 261. The control system 214 may include a controller 212. The controller may receive input data from the various sensors, process the input data, and trigger the actuators in response to the processed input data based on computer-readable instruction or code programmed therein corresponding to one or more routines. The controller 212 receives signals from the various sensors of FIGS. 1-2 and employs the various actuators of FIGS. 1-2 to adjust engine operation based on the received signals and instructions stored on a memory of the controller.

Turning now to FIG. 3, it shows a FOH system 300. The FOH system 300 may be fluidly coupled to the evaporative emissions control system 251 via the first passage 302 and the second passage 304. In one example, the first passage 302 is an inlet passage and the second passage 304 is an outlet passage. The first passage 302 may intersect with the purge line 228 at a junction between the canister 222 and the purge valve 261 at a first extreme end. The first passage 302 may intersect with a FOH inlet passage 315 at a location upstream of a FOH 310 relative to a direction of gas flow. A first valve 303 may be arranged in the first passage 302 and configured to control vapor flow from the canister 222 to the FOH inlet passage 315. The first valve 303 may be adjusted to a fully closed position, a fully open position, or any position therebetween based on a purge condition of the canister 222.

The FOH inlet passage 315 may be further coupled to the FOH regeneration passage 332 and to a fresh air inlet 334. In one example, the FOH inlet passage 315 and the regeneration passage 332 may shape a single passage that extends from an exhaust system of the engine to the FOH 310. A regeneration valve 330, which may be a multi-position valve, may be arranged at an intersection between the FOH regeneration passage 332, the fresh air inlet 334, and the FOH inlet passage 315. The regeneration valve 330 may be configured to flow only air from the fresh air inlet 334 to the FOH inlet passage 315 during a first condition, such as when the FOH is active.

The regeneration valve 330 may be configured to flow only exhaust gases from the FOH regeneration passage 332 to the FOH inlet passage 315 during a second condition, such as a regeneration condition. During conditions where the engine is not combusting, engine compressed gases may flow through the regeneration passage 332. The regeneration valve 330 may be further configured to flow a mixture of fresh air from the fresh air inlet 334 and exhaust gases from the FOH regeneration passage 332 to the FOH inlet passage 315 during a third condition, such as when the FOH is preheated for a regeneration event. In this way, the regeneration valve 330 is a three-way valve.

In some examples, additionally or alternatively, the regeneration valve 330 may be configured as a four-way valve. In such an embodiment, the regeneration valve 330 may be arranged at a four-way intersection between the first passage 302, the fresh air inlet 334, the FOH regeneration passage 332, and the FOH inlet passage 315. In this example, the regeneration valve 330 may be configured to control air flow, exhaust gas flow, and vapor flow to the FOH 310.

The FOH 310 may be configured to combust fuel provided by a FOH injector 317. The exhaust passage injector 320 may be positioned to inject directly into the exhaust passage 235 upstream of the emission control device 270.

When combusting fuel, the FOH 310 may heat air provided from atmosphere through a clean air inlet 306. The heated air may be expelled through an FOH outlet 312. Combustion gases may be expelled from the FOH 310 via an exhaust outlet 314. The exhaust outlet 314 may direct combustion gases directly to atmosphere. In one example, additionally or alternatively, the exhaust outlet 314 may direct combustion gases to the engine exhaust 225 of FIG. 2 at a location upstream of emission control device 270. The combustion gases of the FOH 310 do not mix with cool air or heated air flowing therethrough. In one example, the FOH 310 may include at least one combustion chamber 311 with an ignition device 313 and the FOH injector 317. Fuel and air may be supplied to the combustion chamber, wherein air may flow outside and around the at least one combustion chamber. The FOH 310 may receive fuel via a fuel pump (e.g., fuel pump 221 of FIG. 2). Additionally or alternatively, fuel vapors from the canister 222 may be the fuel source of the FOH 310. Thus, in one example, the FOH 310 may include a clean air inlet 306 in which the air provided from the clean air inlet becomes heated air and does not mix with fuel vapor or liquid fuel. In one example, the clean air inlet may be a single, continuous passage with the FOH outlet 312. The air may be heated as a result of combustion, wherein the heated air is directed to the FOH outlet 312.

A cabin heating valve 316 may be arranged in the FOH outlet 312 at a location downstream of a junction between the FOH outlet 312 and the second passage 304. The cabin heating valve 316 may be adjusted to a fully closed position, a fully open position, or any position therebetween based on a cabin heating request. The position of the cabin heating valve 316 may be further adjusted based on an engine operation in combination with the cabin heating request. In one example, the cabin heating valve may control air flow from the FOH 310 to a vehicle interior cabin.

A second valve 305 may be arranged in the second passage 304. The second valve 305 is configured to control heated air flow from the FOH outlet 312 to a junction between the second passage 304 and the vent line 227. In one example, the second passage 304 intersects with the vent line 227 at a location between the canister 222 and the ELCM 295. In one example, the second valve 305 is a check valve configured to open in the presence of heated air entering the second passage 304 from the FOH outlet 312. Additionally or alternatively, the second valve 305 may be controlled by a controller and configured to move to a fully closed position, a fully open position, or any position therebetween.

Arrows included in FIG. 3 indicate a direction in which gases may flow during various conditions of the FOH system 300 during regeneration of the FOH 310. The regeneration of the FOH 310 may be signaled based on feedback from a delta pressure sensor 318 of the FOH 310. The delta pressure sensor 318 may sense a pressure differential (e.g., a delta pressure) between the FOH inlet passage 315 and the exhaust outlet 314. If the pressure differential is positive, then the combustion chamber 311 of the FOH 310 may be clogged or fouled with soot and may request cleaning. A coked combustion chamber 311 may reduce a combustion efficiency and/or may inhibit intake air flow into the combustion chamber 311. In one example, the exhaust tuning valve 234 may be partially closed and the regeneration valve 330 may be at least partially opened to flow hot exhaust gases from the exhaust passage 235 to the FOH 310. If the exhaust gases are not hot (e.g., less than a threshold temperature), then the exhaust fuel injector 320 may inject fuel at a location upstream of the emission control device 270. The fuel may combust and increase a temperature of the exhaust gas. Regeneration (e.g., cleaning) of the FOH 310 is described in greater detail below.

Turning now to FIG. 4, it shows a method 400 for cleaning the FOH. Gases from the engine may be used to promote regeneration (e.g., cleaning) of the FOH, thereby reducing a load of the combustion chamber of the FOH. Instructions for carrying out method 400 and the rest of the methods included herein may be executed by a controller based on instructions stored on a memory of the controller and in conjunction with signals received from sensors of the engine system, such as the sensors described above with reference to FIGS. 1-3. The controller may employ engine actuators of the engine system to adjust engine operation, according to the methods described below.

The method 400 begins at 402, which includes determining current operating parameters. Current operating parameters may include, but are not limited to, one or more of a manifold vacuum, an engine speed, an engine temperature, a vehicle speed, and an air/fuel ratio.

At 404, the method 400 may include determining a delta pressure across the FOH. The delta pressure may be sensed via a delta pressure sensor of the FOH. Additionally or alternatively, the delta pressure may be inferred based on a position of the regeneration valve and a flow rate through the FOH outlet passage.

At 406, the method 400 may include determining if the pressure differential is equal to zero. If the pressure differential is equal to zero, then the combustion chamber of the FOH may be fouled within a threshold amount and at 408, the method 400 may include not regenerating the FOH.

In some examples, additionally or alternatively, a duration of time elapsed since a previous regeneration may be tracked in combination with a FOH usage to determine if regeneration is desired. In this way, regeneration of the FOH may occur dynamically. Additionally or alternatively, FOH regeneration may be executed when conditions are met and EGR is not requested, such as during low or mid-loads, coasting events, and other engine off events (e.g., all-electric operation). As another example, FOH regeneration may be signaled periodically based on an amount of time elapsed, miles driven, and time used.

At 409, the method 400 may include maintaining the regeneration valve in a first closed position and the exhaust tuning valve in an open position. The first closed position of the regeneration valve may include where only fresh air may flow to the FOH and exhaust gases are blocked from flowing from the exhaust passage to the FOH.

If the pressure differential is not equal to zero, then at 410, the method 400 may include determining if exhaust temperatures are greater than a threshold temperature. The threshold temperature may be based on a non-zero, positive number. The threshold temperature may be equal to a temperature at which soot and unburned hydrocarbons may begin to burn without spark. If the exhaust temperatures are greater than the threshold temperature, then at 412, the method 400 may include passively regenerating the FOH.

At 414, the method 400 may include preheating a heat exchanger of the FOH. In one example, the heat exchanger is included with the combustion chamber. Preheating the heat exchanger may include initiating the FOH. As such, the FOH may be fueled and begin combusting until a determined preheating temperature is reached, which may include operating the FOH for a threshold duration. The determined preheating temperature may be based on a non-zero, positive number. The threshold duration may be based on a non-zero, positive number. During some cleaning conditions, the FOH may be fouled (e.g., coked) beyond a threshold fouling such that combustion within the FOH may not occur. In such an example, a metered amount of exhaust gas may be directed toward the FOH. The metered amount of exhaust gas may be mixed with ambient air to control a temperature rise of the FOH, which may be achieved by placing the regeneration valve in a mixed open position. In one example, as the FOH temperature increases toward the determined preheating temperature, more exhaust gas may be delivered to the FOH. As such, the regeneration valve may be adjusted to a position that is more open toward the FOH regeneration passage and less open toward the fresh air inlet.

At 416, the method 400 may include actuating the regeneration valve to an open position. In one example, the open position is a second open position of the regeneration valve. The second open position may allow only exhaust gases from the exhaust passage to flow to the FOH. The regeneration valve may further include a first open position, the mixed open position, and a fully closed position. The first open position may allow only fresh air to flow to the FOH. The mixed open position may be a combination of the first and second open positions, wherein fresh air and exhaust gases may both flow to the FOH. The closed position of the FOH regeneration valve may include where fresh air and exhaust gases are blocked from flowing to the FOH.

At 418, the method 400 may include actuating the exhaust tuning valve to a partially closed position. In this way, exhaust gases may be directed through the regeneration passage and through a tailpipe of the vehicle.

At 420, the method 400 may include flowing exhaust gases to the FOH. The exhaust gases may ignite the soot and cleaning of the FOH may be initiated. As such, fuel may not be supplied to the FOH or the exhaust gases during the passive regeneration of the FOH. Exhaust gas temperatures are greater than the threshold temperature and may ignite soot coked onto the FOH without fuel or other combustibles.

At 422, the method 400 may include monitoring the delta pressure across the FOH.

At 424, the method 400 may include determining if the delta pressure is equal to zero. If the delta pressure is not equal to zero or another determined differential pressure thereby indicating that the FOH is cleaned, then the method 400 may continue to flow exhaust gases to the FOH.

If the delta pressure is equal to zero or another determined differential pressure indicating the FOH is cleaned, then at 426, the method 400 may include deactivating the FOH regeneration. Deactivating the FOH regeneration may include actuating the regeneration valve to the fully closed position or to the first open position and fully opening the exhaust tuning valve.

Returning to 410, if the exhaust temperatures are not greater than the threshold temperature, then at 428, the method 400 may include determining if the engine is combusting. The engine is combusting if then engine is being fueled. If the engine is combusting and exhaust gases are being produced, then at 430, the method 400 may include actively regenerating the FOH.

At 432, the method 400 may include injecting fuel into an exhaust gas stream upstream of the aftertreatment device. In one example, the exhaust passage injector may be activated and begin injecting fuel into the exhaust passage, wherein the fuel may combust and increase an exhaust gas temperature toward the threshold temperature. The aftertreatment device may treat the exhaust gases. Additionally or alternatively, the active regeneration may include injecting fuel into the FOH. The fuel injected into the FOH may ignite in the presence of the exhaust gases, which may initiate regeneration of the FOH. The active regeneration may proceed to execute 416-424 of the passive regeneration routine.

In some examples, active regeneration may only be initiated during conditions where FOH use is requested and cleaning is demanded. If cleaning is demanded and FOH use is not requested, then the method may include waiting until passive regeneration conditions are met. By doing this, an efficiency of the regeneration may be increased.

Returning to 428, if the engine is not combusting, then the method 400 proceeds to 502 of method 500 of FIG. 5, which includes determining if the vehicle is on. The vehicle may be on if an ignition key is turned or an ignition button is depressed. Additionally or alternatively, the vehicle may be on in response to a pedal being depressed. If the vehicle is not on, then at 504, the method 500 may include not regenerating the FOH. As such, the FOH may not be heated and soot coked on the FOH is not burned.

If the vehicle is on, then at 506, the method 500 may include cranking the engine. The vehicle may be on and not combusting, such as during a coasting event or an all-electric operation of the vehicle. As such, the method 500 may opportunistically regenerate the FOH during vehicle on, non-combusting operations.

At 508, the method 500 may include actuating the regeneration valve to the second open position. As such, the cranked engine intake gases may flow to the FOH. That is to say, the engine may crank and compress ambient air such that a pressure of the ambient air increases as it flows to the exhaust passage.

At 510, the method 500 may include actuating the exhaust tuning valve to a partially closed position.

At 512, the method 500 may include flowing the engine compressed air to the FOH.

At 514, the method 500 may include fueling the FOH. As such, the FOH injector may be activated and begin injecting fuel into the combustion chamber (e.g., heat exchanger) of the FOH. The fuel may mix with the engine compressed air and ignite via compression or spark. Combustion of the fuel and air may initiate regeneration of the FOH.

At 516, the method 500 may include monitoring the delta pressure across the FOH.

At 518, the method 500 may include determining if the delta pressure is equal to zero. If the delta pressure is not equal to zero, then the method 500 continues to flow engine compressed air to the FOH while injecting fuel into the FOH. As such, the regeneration may continue if the delta pressure is not equal to zero. If the delta pressure is equal to zero, then the regeneration may be stopped. Stopping the regeneration may include closing the regeneration valve, opening the exhaust tuning valve, and no longer cranking the engine.

Turning now to FIG. 6, it shows a graph 600 illustrating an operating sequence graphically displaying conditions of a regeneration of the FOH. Plot 610 illustrates an engine exhaust gas temperature, dashed lines 612 illustrates a threshold temperature, and dashed plot 614 illustrates an increased exhaust gas temperature. Plot 620 illustrates a regeneration valve position. Plot 630 illustrates a position of the exhaust tuning valve. Plot 640 illustrates a FOH delta pressure. Plot 650 illustrates an exhaust fuel injector condition. Time increases from a left to a right side of the figure.

Prior to t1, the FOH delta pressure is relative high. Thus, the delta pressure is not equal to zero and regeneration of the FOH is requested. The engine exhaust temperature is less than the threshold temperature. At t1, the exhaust fuel injector is activated. As such, fuel is injected into an exhaust stream. As such, an increased exhaust gas temperature may be realized relative to the engine exhaust gas temperature between t1 and t2.

At t2, the increase exhaust gas temperature is equal to the threshold temperature. As such, the regeneration valve is moved to an open position that allows exhaust gases to flow to the FOH. The exhaust tuning valve is moved to a partially closed position between a fully open position and a fully closed position.

Between t2 and t3, the FOH delta pressure begins to decrease, thereby indicating an active regeneration of the FOH to a less coked state.

At t3, the engine exhaust gas temperature begins to increase, which may be due to an increase in an engine load. In one example, as the engine exhaust gas temperature increases toward the threshold temperature between t3 and t4, an amount of fuel injected by the exhaust fuel injector may decrease. By doing this, the increased exhaust gas temperature may be controlled to mitigate overheating of the FOH.

At t4, the engine exhaust gas temperature is equal to the threshold temperature. As such, the exhaust fuel injector is deactivated. Between t4 and t5, the FOH is regenerated via only engine exhaust gases. As such, passive regeneration of the FOH occurs and fuel is not injected into the FOH or the exhaust passage.

At t5, the FOH delta pressure is equal to zero. As such, the regeneration of the FOH may be terminated. Termination of the regeneration may include closing the regeneration valve to block exhaust gases from flowing to the FOH and actuating the exhaust tuning valve to a fully open position. After t5, the engine exhaust gas temperature remains above the threshold temperature. The engine exhaust gas is blocked from flowing to the FOH via the regeneration valve being positioned in the fully closed position or another position that seals the regeneration passage from the FOH.

The disclosure provides support for a system including a fuel operated heater (FOH) fluidly coupled to an exhaust system of an engine. A first example of the system further includes where a regeneration passage extends from the FOH and intersects with an exhaust passage of the exhaust system at a location downstream of an aftertreatment device relative to a direction of exhaust gas flow. A second example of the system, optionally including the first example, further includes where a valve is arranged in the regeneration passage, the valve configured to control exhaust gas flow from the exhaust passage to the FOH. A third example of the system, optionally including one or more of the previous examples, further includes where the exhaust system comprises an exhaust tuning valve. A fourth example of the system, optionally including one or more of the previous examples, further includes a controller with computer-readable instructions that when executed cause the controller to initiate a regeneration of the FOH in response to a delta pressure of the FOH. A fifth example of the system, optionally including one or more of the previous examples, further includes where the instructions further cause the controller to flow exhaust gases from the exhaust system during the regeneration of the FOH. A sixth example of the system, optionally including one or more of the previous examples, further includes where the exhaust system further comprises a fuel injector positioned to inject fuel directly into an exhaust gas stream.

The disclosure provides additional support for a system including a fuel operated heater (FOH) fluidly coupled to an exhaust system of an engine and a vehicle interior cabin and a controller comprising computer-readable instructions that when executed enable the controller to direct exhaust gases from exhaust system to the FOH in response to a regeneration request. A first example of the system further includes a fuel injector positioned upstream of an aftertreatment device of the exhaust system, the fuel injector positioned to inject fuel directly into an exhaust stream, and wherein the FOH is fluidly coupled to a location of the exhaust system downstream of the aftertreatment device relative to a direction of exhaust gas flow. A second example of the system, optionally including the first example, further includes where the instructions further enable the controller to activate the FOH prior to flowing exhaust gases to the FOH for a threshold duration. A third example of the system, optionally including one or more of the previous examples, further includes where the instructions further enable the controller to flow a mixture of exhaust gas and fresh air to the FOH prior to flowing exhaust gases to the FOH via a multi-position valve. A fourth example of the system, optionally including one or more of the previous examples, further includes a differential pressure sensor coupled to an inlet and an outlet of the FOH. A fifth example of the system, optionally including one or more of the previous examples, further includes where the regeneration request is in response to a pressure differential sensed by the differential pressure sensor. A sixth example of the system, optionally including one or more of the previous examples, further includes where the FOH is deactivated and unfueled when exhaust gases are directed to the FOH. A seventh example of the system, optionally including one or more of the previous examples, further includes where the instructions further enable the controller to crank the engine and flow engine compressed air to the FOH in response to the regeneration request being present when the engine is not combusting.

The disclosure provides further support for a method including activating a fuel operated heater (FOH) for a threshold duration, deactivating the FOH, and flowing exhaust gases from an engine to the FOH. A first example of the method optionally includes injecting fuel into an exhaust stream in response to a temperature of the exhaust gases being less than a threshold temperature. A second example of the method, optionally including the first example, optionally includes maintaining the FOH active and cranking the engine in response to the engine being unfueled. A third example of the method, optionally including one or more of the previous examples, further includes where a metered amount of exhaust gas is delivered to the FOH in response to the FOH not activating for the threshold duration. A fourth example of the method, optionally including one or more of the previous examples, further includes where the metered amount of exhaust gas is mixed with fresh air prior to contacting the FOH.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a fuel operated heater (FOH) fluidly coupled to an exhaust system of an engine and a vehicle interior cabin; and
a controller comprising computer-readable instructions that when executed enable the controller to:
direct exhaust gases from exhaust system to the FOH in response to a regeneration request; and
crank the engine and flow engine compressed air to the FOH in response to the regeneration request being present when the engine is not combusting.

2. The system of claim 1, wherein a regeneration passage extends from the FOH and intersects with an exhaust passage of the exhaust system at a location downstream of an aftertreatment device relative to a direction of exhaust gas flow.

3. The system of claim 2, wherein a valve is arranged in the regeneration passage, the valve configured to control exhaust gas flow from the exhaust passage to the FOH.

4. The system of claim 1, wherein the exhaust system comprises an exhaust tuning valve.

5. The system of claim 1, wherein the instructions further cause the controller to initiate a regeneration of the FOH in the presence of the regeneration request in response to a delta pressure of the FOH.

6. The system of claim 5, wherein the instructions further cause the controller to flow exhaust gases from the exhaust system during the regeneration of the FOH.

7. The system of claim 1, wherein the exhaust system further comprises a fuel injector positioned to inject fuel directly into an exhaust gas stream.

8. A system, comprising:
a fuel operated heater (FOH) fluidly coupled to an exhaust system of an engine and a vehicle interior cabin;
a differential pressure sensor coupled to an inlet and an outlet of the FOH; and
a controller comprising computer-readable instructions that when executed enable the controller to:
direct exhaust gases from exhaust system to the FOH in response to a regeneration request, wherein the regeneration request is in response to a pressure differential sensed by the differential pressure sensor.

9. The system of claim 8, further comprising a fuel injector positioned upstream of an aftertreatment device of the exhaust system, the fuel injector positioned to inject fuel directly into an exhaust stream, and wherein the FOH is fluidly coupled to a location of the exhaust system downstream of the aftertreatment device relative to a direction of exhaust gas flow.

10. The system of claim 8, wherein the instructions further enable the controller to activate the FOH prior to flowing exhaust gases to the FOH for a threshold duration.

11. The system of claim 8, wherein the instructions further enable the controller to flow a mixture of exhaust gas and fresh air to the FOH prior to flowing exhaust gases to the FOH via a multi-position valve.

12. The system of claim 8, wherein the FOH is deactivated and unfueled when exhaust gases are directed to the FOH.

13. The system of claim 8, wherein the instructions further enable the controller to crank the engine and flow engine compressed air to the FOH in response to the regeneration request being present when the engine is not combusting.

14. A method, comprising:
activating a fuel operated heater (FOH) for a threshold duration;
deactivating the FOH;
flowing exhaust gases from an engine to the FOH; and
maintaining the FOH active and cranking the engine in response to the engine being unfueled.

15. The method of claim 14, further comprising injecting fuel into an exhaust stream in response to a temperature of the exhaust gases being less than a threshold temperature.

16. The method of claim 14, wherein a metered amount of exhaust gas is delivered to the FOH in response to the FOH not activating for the threshold duration.

17. The method of claim 16, wherein the metered amount of exhaust gas is mixed with fresh air prior to contacting the FOH.

* * * * *